Aug. 4, 1953  B. BOYD  2,647,983
POWER REGULATION IN HIGH-FREQUENCY HEATING APPARATUS
Filed Dec. 22, 1948  2 Sheets-Sheet 1
Fig. 1.
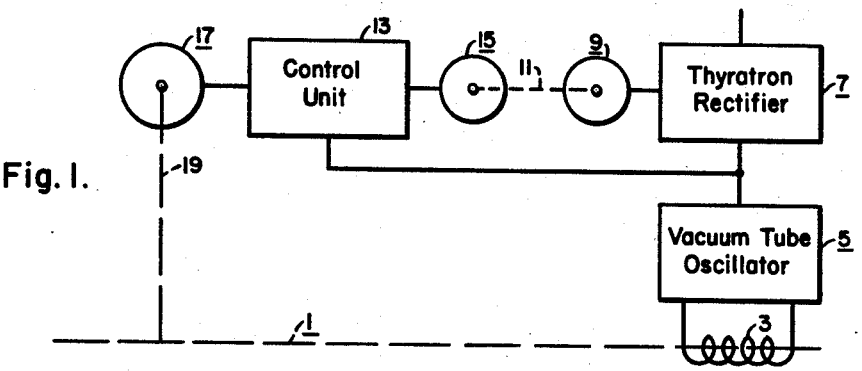
Fig. 3.
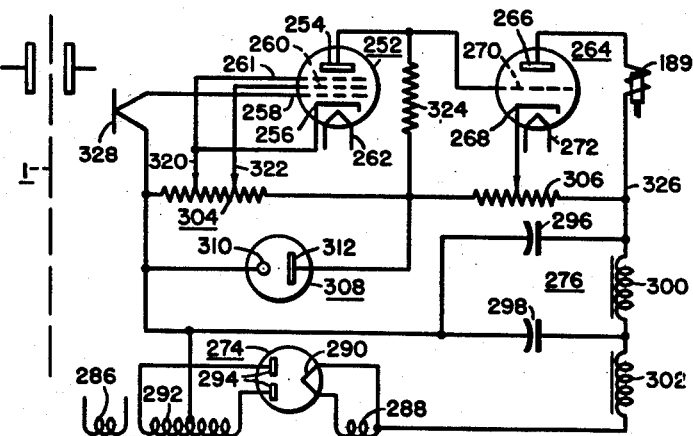
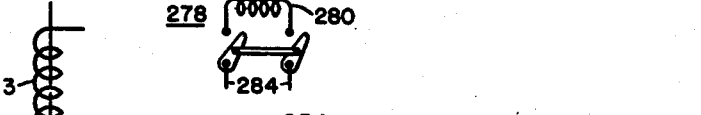
Fig. 4.
WITNESSES:
Robert C. Baird
New. C. Groome
INVENTOR
Bruce Boyd.
BY
Hymen Diamond.
ATTORNEY

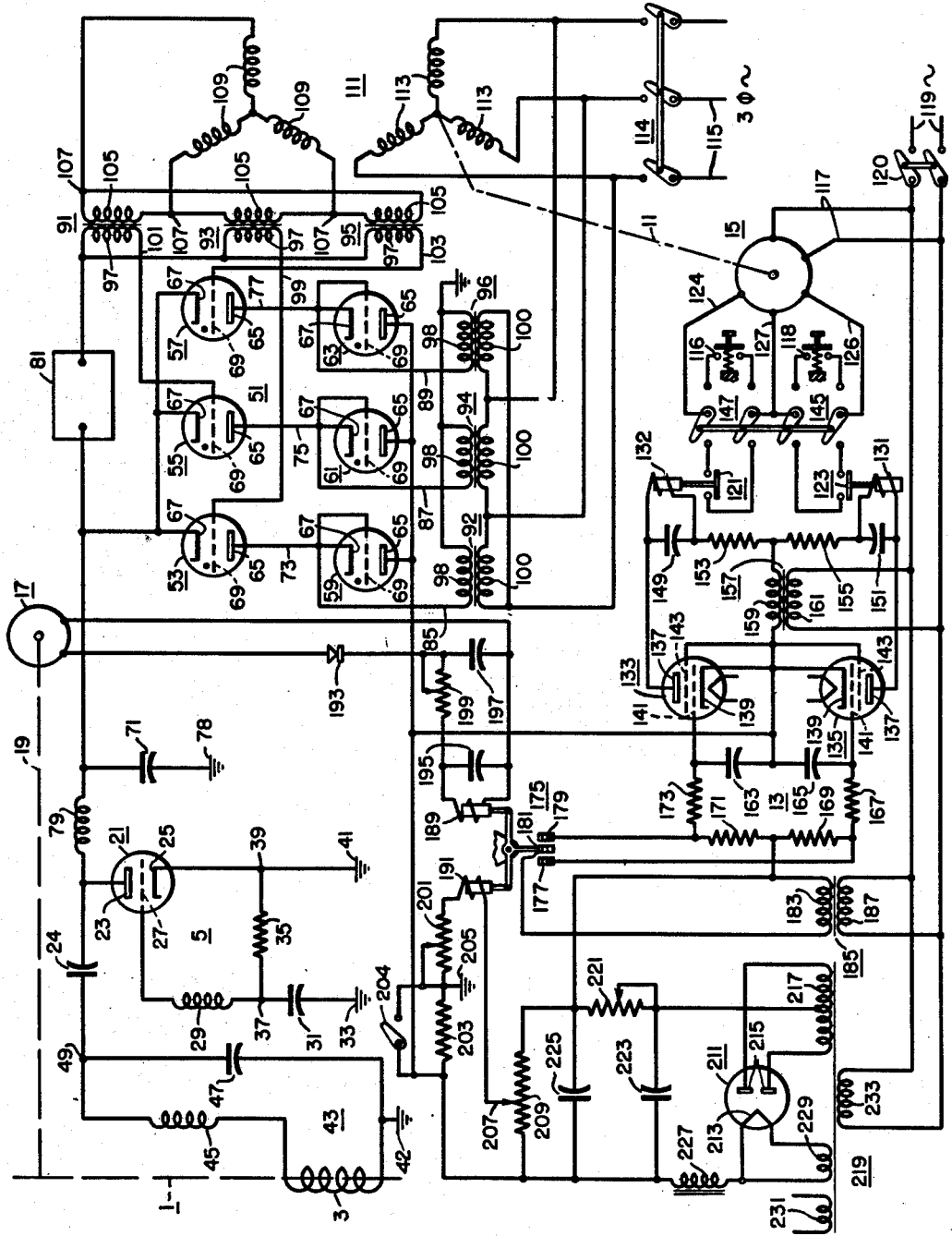

Patented Aug. 4, 1953

2,647,983

UNITED STATES PATENT OFFICE 2,647,983

POWER REGULATION IN HIGH-FREQUENCY HEATING APPARATUS

Bruce Boyd, Baltimore, Md., assignor to Westinghouse Electric Corporation, East Pittsburgh, Pa., a corporation of Pennsylvania Application December 22, 1948, Serial No. 66,822

6 Claims. (Cl. 219—47)

1

My invention relates to high frequency electrical apparatus and particularly to such apparatus as used in induction and dielectric heating, and the control thereof.

One of the difficult problems encountered in high frequency heating is that of controlling the temperature of the material being heated within narrow critical limits. Absence of accurate and quick responsive control will often result in a defective article that must be scrapped. Not only is the raw material wasted, but also all the time and labor that precedes the heat treating step. In these days of high costs and needed production, such losses are even more acutely felt. For example, in the industrial application involving the continuous operation of soldering a cable sheath, the temperature of the work at the soldering point must be kept constant within critical limits. Since solder cools very rapidly, a variation in work speed or in heat generator output will very likely result in an open spot on the work. In the case of a cable sheath, if the flaw is not detected, the cable might be installed underground and will then certainly cause trouble. In order to detect and repair such defective spots at the point of manufacture, a lot of time and money must be spent.

It is also desirable, especially in a continuous heat treatment process, to change the conveyor speed in order to match the optimum heat generator output to the size of material being heated. Thus for a given size heat generator it is desirable to convey ½" material at a faster rate than 1" material of the same type, thereby gaining maximum possible efficiency of the equipment. Regulation of the energy delivered to the heating point in response to changes in speed and size or type of work being heated is of prime importance.

Attempts have been made to utilize a triode discharge device in the grid circuit of a high frequency oscillator to effect a change in oscillator grid bias in response to change in work load current. While such a system is cheap enough for low power installations, it is rendered impractical because of difficulties encountered in its stabilization.

It is accordingly the general object of my invention to provide a regulating system for a high frequency heat generator which is more efficient and less expensive than those exemplified by prior art.

More specifically, it is an object of my invention to provide a regulator for a high frequency heat generator which will respond quickly to effect an appropriate change in the quantity of energy supplied to the work being heated at the heating point.

Another object of my invention is to provide a regulator system for a high frequency heat generator which will maintain the temperature of the work at the heating point substantially constant.

A further object of my invention is to provide a regulator system for a high frequency heat generator which will cause an optimum amount of energy to be delivered to the work being heated for a given work speed, size and type.

A still further object of my invention is to provide a device for efficient regulation of energy delivered by a high frequency heat generator, responsive to energy being radiated from the work being treated.

Briefly stated my invention comprises the comparison of a quantity which is a function of the load current of a high frequency heat generator with a quantity which is a function of a condition of the work being heated, and utilizing the resultant to effect a rapid correction in the output of the high frequency generator.

My invention, together with additional objects and advantages thereof, will best be understood from the following description when read in connection with the accompanying drawings, in which:

Figure 1 is a block diagram of a preferred embodiment of my invention.

Figure 2 is a schematic circuit diagram of a preferred embodiment of my invention.

Figure 3 is a schematic showing of a thermopile device, which may be used in one embodiment of my invention.

Figure 4 is a schematic showing of a photoelectric pick-up device which may be used in another embodiment of my invention.

The block diagram of Figure 1 illustrates an embodiment of my invention in which it is desired to maintain a constant work temperature regardless of the type or size of the work being treated or the speed at which it is being conveyed past the heating point. The system includes a conveyor 1 which conveys work to be heated through a work coil 3. Energy is supplied to the work coil 3 by a high frequency oscillator generator 5 whose power supply is a thyratron rectifier 7. A phase shifting device 9 is connected through appropriate means to the thyratron rectifier 7. A control unit 13 controls the direction and degree of rotation of a reversible motor 15 whose shaft 11 is physically connected to the shaft of the phase shifter. Two voltages are fed into the control unit, one of which is derived from the thyratron rectifier circuit and is proportional to the oscillator generator load and the other is derived from a tachometer 17 whose shaft 19 is physically connected to the conveyor 1 and which is proportional to the conveyor speed. The resultant of these voltages determines the direction and degree of rotation of the motor 15, and hence the degree and sense of the phase shift, and therefore the rectifier 7 and oscillator generator 5 output.

Referring now to Figure 2, the high frequency oscillator generator circuit indicated generally at 5 includes a triode oscillator tube 21, which may, for example, be type WL-892 having an anode 23, a cathode 25 and a grid 27.

An inductance 29 and a capacitor 31 are connected in series between the grid 27 of the oscillator tube 21 and ground 33. A grid bias resistor 35 is connected from the cathode 25 to a point 37 common to the last mentioned inductance 29 and capacitor 31. There is a connection between the junction 39 of the grid bias resistor 35 and the cathode 25 to ground 41. The oscillator generator tank circuit indicated generally at 43 comprises an inductance 45, a capacitor 47, and a work coil 3 connected in series. A coupling capacitor 24 is connected from a point 49 between the tank circuit inductance 45 and capacitor 47 to the anode 23 of the triode oscillator tube 21. The capacitor 47 side of the work coil 3 is connected to ground 42. The work being treated is passed through the work coil 3 on a conveyor indicated generally at 1.

Power is supplied to the oscillator generator by a thyratron rectifier indicated generally at 51 which includes six thyratron tubes 53, 55, 57, 59, 61, and 63, each having an anode 65, a cathode 67, and a grid 69.

These six thyratron tubes are connected in three parallel groups 73, 75, 77 of two tubes each of which are connected in series. The grid of only one tube in each group is controlled. The output of the thyratron rectifier 51 is fed to the oscillator generator 5 through a coupling inductance 79 which has one side connected to the oscillator tube anode 23 and the other side connected to the cathodes 67 of the grid controlled thyratrons 53, 55 and 57. A bypass capacitor 71 is connected from the thyratron cathode side of the coupling inductance 79 to ground 78.

Three phase A. C. power is supplied to the thyratron rectifier through three coupling transformers 92, 94, 96, whose primaries 100 are delta connected and whose secondaries 98 are star connected. A leg 85, 87, 89 of the star being connected to a point between the anode 65 of a controlled thyratron 53, 55, 57 and the cathode 67 of the corresponding non-controlled thyratron 59, 61, 63 of each series thyratron group 73, 75, 77 respectively. The vertices of the delta are connected one to each primary leg 113 of the phase shifter 111.

The three phase control voltage is supplied to the grids 69 of the control thyratrons 53, 55, 57 through three grid coupling transformers 91, 93, 95. The secondaries 97 of these transformers are star connected, each leg 99, 101, 103 of the star being connected to the grid of a controlled thyratron tube 53, 55, 57 respectively. The primaries 105 of the grid coupling transformers are delta connected, the vertices 107 of the delta being connected to the secondary legs 109 of a phase shifter indicated generally at 111.

The primary legs 113 of the phase shifter 111 are connected through a switch 114 to 3 phase power source 115.

A negative grid bias is supplied to the controlled thyratrons from any convenient source 81 which is connected from the cathode 67 of the controlled thyratrons 57, 53, 51 to the neutral of the grid coupling transformer secondaries.

The shaft of the phase shifter 111 is physically connected to the rotor shaft 11 of a reversible motor 15 which drives the phase shifter.

The reversible motor 15 may be of the shaded pole single phase A. C. induction type. Single phase A. C. power is supplied to the field winding of the reversible motor by appropriate connections 117, through a switch 120, to a convenient source 119.

A pair of double pole double throw switches 145, 147 are provided so that the reversible motor 15 may be either manually controlled by means of push button switches, or automatically controlled by the control unit 13 heretofore mentioned. One side of the center poles of these switches have a common appropriate connection 127 to the reversible motor 15. The other side of the center poles each have a separate appropriate connection 124, 126, to the reversible motor 15. There is a push button switch 116, 118 connected across one pair of the end poles of each switch 145, 147.

When the double pole double throw switches 145, 147 are closed to the manual operating position, the motor may be manually controlled by closing the appropriate push button switch 116 or 118. When the double pole double throw switches 145, 147 are closed to the automatic operating position, the direction of rotation of the reversible motor is controlled by a pair of relays 121, 123. The other end poles of the double pole double throw switches 145, 147 are connected, each pair across the stationary contacts of one of these relays 121, 123. The movable contacts of the motor relays 121, 123 are each actuated by a solenoid coil 131, 132 which is located in the plate circuit of the control unit as will be more fully explained hereinafter.

The control unit for controlling the direction and degree of rotation of the reversible motor 15, indicated generally at 13, includes a pair of thyratron tubes 133, 135 which may be of the type 2050 each having an anode 137, a cathode 139, a control grid 141, and a suppressor grid 143. The suppressor grids 143 are connected together and are common to the cathodes 139 which are also connected together. Connected in series between the anode 137 of the first control unit thyratron tube 133 and the anode 137 of the second control unit thyratron tube 135 is a relay solenoid coil 132, a resistor 153, another resistor 155 and a relay solenoid coil 131 respectively. These relay solenoid coils 132, 131 are by-passed by capacitors 149, 151. The purpose of the resistors 153, 155 is to limit the relay solenoid coil 131, 132 current. The purpose of the capacitors 149, 151 is to produce an inertia effect on the relay solenoid coil current when the reversible motor 15 is being operated by the control unit, which will be more fully explained hereinafter. Anode voltage is supplied to the control unit thyratron tubes 133, 135 through a transformer 157 whose secondary 159 is connected between a point common to the cathodes 139 of these tubes and a point common to the solenoid coil current limiting resistors 153, 155, and whose primary 161 is connected through a switch 120 to a single phase A. C. source 119. The grids 141 of these tubes 133, 135 are connected to the capacitor-resistor junctions of a circuit which includes two capacitors 163, 165 connected together in series with four resistors 167, 169, 171, 173. There is a connection between a point common to these capacitors 163, 165 and a point common to the control unit thyratron tube cathodes 139. The purpose of the capacitors 163, 165 is to stabilize the thyratron tubes. The purpose of the two resistors 167, 173, which are connected nearest to the capacitors, is to limit the thyratron grid current. The purpose of the other two resistors 169, 171 is to limit the contact current of a polarized relay indicated generally at 175 whose stationary contacts 177, 179 are connected to the noncommon ends of these resistors 169, 171. The movable contact 181 of the polarized relay 175 is connected through the secondary 183 of a transformer 185 to a point common to the relay contact current limiting resistors 169 and 171. The primary 187 of this transformer is connected through a switch 120 to a single phase A. C. supply line 119.

One coil 189 of the polarized relay is connected to an A. C. tachometer 17 whose shaft 19 is physically connected to the conveyor 1. A rectox element 193 and a filter circuit are connected between this relay coil 189 and the tachometer 17 for the purpose of rectifying and smoothing out the voltage generated by the tachometer.

The filter circuit comprises two capacitors 195, 197, and a potentiometer 199. One of these capacitors 195 is connected across the relay coil 189. The potentiometer 199 is connected from one side of this capacitor 195 through the rectox unit 193 to the tachometer 17. The other capacitor 197 is connected so as to have one side common to the other side of the first mentioned capacitor 195 and the other side common to the potentiometer and the rectox unit 193.

In series with one side of the other polarized relay coil 191 are a potentiometer 201 and a resistor 203.

The purpose of the resistor 203 is to provide a potential drop which is proportional to the oscillator generator load current. The side of this resistor 203 common to the potentiometer 201 is connected to ground as shown at 205, and the other side is connected to the anodes 65 of the non-controlled thyratron rectifier tubes 59, 61, 63. The other side of this polarized relay coil 191 is connected to the movable element 207 of a voltage divider 209. One side of this voltage divider 209 is connected to the anodes 65 of the non-controlled thyratron rectifier tubes 59, 61, 63, and to the cathodes 139 of the thyratron control tubes 133, 135, while the other side is connected to a point common to the polarized relay contact current limiting resistors 169, 171.

The purpose of the voltage divider 209 is to apply a constant voltage bias to one coil of the polarized relay for reasons hereinafter to be more fully explained, and a constant negative bias to the grids 141 of the control unit thyratron tubes 133, 135. The voltage which is supplied to the voltage divider is derived from a full wave rectifier tube 211 which may be type 5U4 having a cathode 213 and two anodes 215. One secondary winding 217 of a multi-secondary transformer, indicated generally at 219, is connected between the two anodes 215 of this rectifier tube 211. A center tap is taken from this secondary winding 217 through a potentiometer 221 to the side of the voltage divider 209 which is common to the relay coil current limiting resistors 169, 171. A filter circuit comprising a pair of capacitors 223, 225, an iron core inductance 227, and the potentiometer 221 last mentioned is provided in the output circuit of the full wave rectifier for the purpose of furnishing a smooth D. C. bias to the polarized relay coil 191. One of these capacitors 225 is connected across the voltage divider 209. The iron core inductance 227 is connected between the full wave rectifier cathode 213 and the control unit thyratron cathodes 139. The other capacitor is connected between the thyratron cathodes 139 and the transformer center tap side of the potentiometer 221. A winding 229 of the multi-secondary transformer 219 is connected across the cathode 213 of the full wave rectifier to supply cathode voltage thereto. A third secondary winding 231 of the multi-secondary transformer 219 is provided to furnish cathode voltage to the two control unit thyratron tubes 133, 135, which cathodes are connected in parallel across that winding. The primary 233 of the multi-secondary transformer is supplied through a switch 120 from a single phase A. C. source 119.

Although many applications of my invention will be apparent to those skilled in the art, it will be assumed for the purpose of explaining its operation, that it is desired to solder a cable sheath in a continuous operation. Referring now to Figure 2, assume that both reversible motor relay switches 121, 123, are open, that the double pole double throw switches 145, 147 are in position for automatic operation of the reversible motor 15, that the phase shifter 111 is in a position to cause maximum power to be delivered from the thyratron rectifier 51, and that the polarized relay 175 is in neutral position, and the conveyor 1 is stopped. To begin operation, the single phase A. C. power circuit 119 is closed by means of switch 120, whereupon the reversible motor 15 field winding is energized, cathode voltage is supplied, through one secondary winding 231 of the multi-secondary transformer 219 to the control unit thyratron tubes 133, 135, and through another secondary winding 229 of the same transformer to the full wave rectifier tube 211. Anode voltage is supplied through the appropriate coupling transformer 157 to the control unit thyratron tubes 133, 135, and the primary winding 187 of the control unit grid coupling transformer 185 is energized. Anode voltage is supplied through a secondary winding 217 of the multi-secondary transformer 219 to the full wave rectifier 211.

The three phase supply circuit 115 is closed by means of switch 114, thereby energizing the thyratron rectifier anode coupling transformers 92, 94, 96 and the phase shifter 111.

The full wave rectifier 211 now operates to put a D. C. voltage across the voltage divider 209. The D. C. voltage of the voltage divider is applied in the grid circuits of the control unit thyratrons to establish a negative cut-off bias on the grids of those tubes. An amount of this D. C. voltage sufficient to cause the polarized relay 175 to close to its left-hand contact 177 is tapped off the voltage divider 209 and applied to the appropriate polarized relay coil 191. The closing of this polarized relay contact 177 causes the secondary voltage of the grid coupling transformer 185 to be applied across the lower polarized relay contact current limiting resistor 169. Now when on the first positive half cycle, the A. C. voltage exceeds the D. C. bias voltage, the capacitors 163, 165 in the control unit grid circuits will be charged so that there is a positive bias on the grid 141 of the lower amplifier tube 135 sufficient to cause it to fire, and a negative bias on the grid 141 of the upper amplifier tube 133 sufficient to prevent its firing. Then as the A. C. anode voltage of the firing amplifier tube 135 passes through zero, that tube will cease to fire.

So long as the polarized relay 175 contacts are closed to the left side 177, the lower amplifier tube 135 will fire on every positive half cycle and the upper amplifier tube 133 will not fire at all.

The firing of the lower amplifier tube causes a series of voltage pulses to be placed across the coil 131 of the lower reversible motor control relay 123. The capacitor 151 which is connected across this coil gives an inertia or smoothing effect which prevents chatter of the relay 123. The closing of the lower reversible motor relay 123 will cause the reversible motor 15 to rotate the phase shifter 111 in the direction to decrease the firing time of the thyratron rectifier controlled tubes 53, 55, 57 and thus reduce its power output, and hence the power output of the oscillator generator 5 and the heat generated in the cable sheath being soldered.

Now after a time delay suitable to allow the solder and cable sheath to reach the proper soldering temperature (by means not shown) the conveyor 1 is started. When the conveyor 1 has reached the proper running speed for the size and type cable sheath being soldered, the tachometer 17 which is responsive to conveyor speed, will be generating a voltage sufficient to pull the polarized relay 181 back to neutral position. This voltage will be sufficient to balance the potential tapped from the voltage divider 209 plus the potential furnished by the oscillator anode current across its voltage dropping resistor 203.

Next assume that the speed of the conveyor 1 has increased so that it is necessary to deliver more energy to the cable sheath in order to maintain proper soldering temperature. Then the tachometer voltage will increase and pull the polarized relay 175 contact closed to the right side 179, thus placing the control unit thyratron A. C. grid voltage across the upper polarized relay contact current limiting resistor 171. This will cause the upper amplifier tube 133 to fire in the manner previously described, thus closing the upper reversible motor relay 121 contacts to cause the motor 15 to rotate the phase shifter 111 in the direction to increase the firing time of the controlled thyratron rectifier tubes 53, 55, 57, increasing its output and therefore increasing the oscillator generator 5 output and the energy supplied to the cable sheath being soldered. When the oscillator anode current has been increased sufficiently to cause its dropping resistor 203 potential to increase so as to balance the voltage generated by the tachometer 17 at the increased conveyor speed, then the polarized relay 175 will be pulled back to its neutral position, opening the control unit circuit and therefore the reversible motor 15 circuit causing the phase shifter 111 to come to rest.

Now if the conveyor speed should decrease the voltage generated by the tachometer 17 will decrease and the polarized relay 175 will operate to cause a decrease in energy delivered to the cable sheath being soldered until the polarized relay 175 has again been returned to neutral by a decrease in oscillator anode current in the same manner as has been previously explained.

In applications of my invention where the work temperature is relatively high so as to be within their sensitivity range, I find it desirable to use a photoelectric pick-up device or a thermopile as the work condition responsive means.

The photo-electric pick-up device shown schematically in Fig. 4 includes a photo-electric tube 250, which may be type 918, and which is placed in proximity to the work being heated at the heating point, so that it is responsive to the intensity of light being radiated from the work due to its temperature condition.

The energy derived from the photo-electric tube 250 is subjected to two stages of D. C. amplification. The first D. C. amplifier stage includes an amplifier tube 252 which may be of type 6AC7, having an anode 254, a cathode 256, a control grid 258, a screen grid 260, a suppressor grid 261 and a heater 262. The second D. C. amplifier stage includes an amplifier tube 264 which may be of type 6B4-G, having an anode 266, a cathode 268, a control grid 270 and a heater 272. Anode voltage and grid bias is supplied to the amplifier tubes by a full wave rectifier which includes a full wave rectifier tube 274 which may be of type 5U4-G and a filter circuit indicated generally at 276 for smoothing out the full wave rectifier tube output.

Power is supplied to the full wave rectifier and to the amplifier tube heaters 262, 272 by a multi-secondary transformer 278 having three secondary windings whose primary 280 is connected through a switch 282 to a convenient A. C. source 284. One of the secondary windings 286 of the multi-secondary tansformer is connected across the heaters 262, 272 of the amplifier tubes 252, 264, while another secondary winding 288 is connected across the cathode 290 of the full wave rectifier tube 274. The ends of the third secondary winding 292 are connected each to an anode 294 of the full wave rectifier tube 274.

The filter circuit of the full wave rectifier comprises two capacitors 296, 298 and two iron core inductances 300, 302. One end of the capacitors 296, 298 has a common connection to a center tap on the rectifier tube anode supply secondary winding 292 of the multi-secondary transformer 278. One of the iron core inductances 300 is connected between the other ends of the capacitors 296, 298. One side of the last mentioned iron core inductance 300 is connected through the other iron core inductance 302 to the cathode 290 of the full wave rectifier tube 274. There is a connection from the rectifier tube anode supply secondary winding 292 center tap which is the low voltage side of the rectifier output, through a two tap voltage divider 304 and then through a single tap voltage divider 306 to the side of an iron core inductance 300 which is common to one end of a capacitor but not common to the other iron core inductance 302 which is the high voltage side of the rectifier output. A voltage regulator tube 308 which may be type VR-150 is connected across the two tap voltage divider 304 in a manner such that its cathode 310 is common to the rectifier tube anode supply secondary winding 292 center tap and its anode 312 is common to the two tap voltage divider 304 and the single tap voltage divider 306. There is a connection from the grid 258 of the first amplifier tube 252 through a grid bias resistor 314 to the voltage regulator cathode 310 side of the two tap voltage divider 304. The photo-electric tube 250 has its anode 316 connected to the control grid 258 and its cathode 318 connected to the screen grid 260 of the first amplifier tube 252.

The cathode 256 of the first amplifier tube 252 is connected to the tap 320 of the two tap voltage divider 304 which is nearest the low voltage side of the rectifier output. The screen grid 260 of the first amplifier tube 252 is connected to the other tap 322 of the two tap voltage divider 304, and the suppressor grid 261 is connected to the cathode 256. The first amplifier stage is coupled to the second amplifier stage by means of a coupling resistor 324 which has one side common to the first amplifier tube anode 254 and the second amplifier tube grid 270 and the other side common to the voltage dividers 304, 306. One coil 189 of a polarized relay 175 is connected between the anode 266 of the second amplifier tube 264 and the high voltage side 326 of the single tap voltage divider 306.

For the purpose of describing the operation of the embodiment of my invention in which a photo-electric pick-up device is used as the work condition responsive means, assume that such a device as shown in Fig. 4 has been connected to one coil 189 of the polarized relay 175 in lieu of the tachometer circuit shown in Figure 2 and the reversible motor 15 connections 124, 127, 126 have been reversed so that when the upper motor relay 132 is closed the motor 15 will rotate the phase shifter 111 in the sense to decrease the thyratron rectifier 51 output. Assume also that both reversible motor relay switches 121, 123 are open, that the double pole double throw switches 145, 147 are in position for automatic operation of reversible motor 15, the phase shifter 111 is in a position to cause maximum power to be delivered from the thyratron rectifier 51, the polarized relay 175 is in neutral position, the conveyor 1 is stopped, and the photo-electric device has been energized by the closing of its A. C. power supply circuit by means of an appropriate switch 282.

To begin operation, the remainder of the equipment is energized in the manner set forth in the description of the operation of the first embodiment of my invention. When the work temperature reaches a value such that the intensity of light radiated from the work is within the sensitivity range of the photo-electric tube 250 then the voltage developed across that tube and applied between the control 258 and screen grids 260 of the first amplifier tube 252 will upset the bias balance of the last mentioned tube 252 causing it to conduct. The output of the first amplifier stage is amplified by the second amplifier stage and applied to the right hand polarized relay coil 189. That portion of the voltage divider 209 which is connected in series with the left hand polarized relay coil 191 is adjusted so that the voltage applied to said relay coil will cause the polarized relay 175 to be balanced when the work is at the desired temperature. The voltage drop from the oscillator anode current dropping resistor 203 is reduced to zero for this form of operation. This may be done in any convenient manner, for example, by means of a switch 204 connected in shunt with the resistor 203.

When the work temperature reaches the point for which the system has been calibrated there will be sufficient current produced in the right hand polarized relay coil 189 to pull the relay contacts to neutral position.

Should the work temperature exceed the calibrated temperature the photo-electric pick-up device will produce an output sufficient to close the polarized relay contacts to the right hand side 179 which will operate the equipment in the manner heretofore described so as to reduce the output of the oscillator generator 5.

When it is desired to use a thermopile as the work condition responsive element, such a device as is shown in Fig. 3 may be employed. It will be noted that the circuit shown in Fig. 3 is identical to that shown in Fig. 4 except that the photoelectric tube 250 has been eliminated and the grid bias resistor 314 is replaced by a thermoelement 328 whose resistance is a function of its temperature. This thermo-element 328 is placed in proximity to the work being heated at the heating point, so that it is responsive to the intensity of heat being radiated from the work due to its temperature condition. When the thermopile circuit is energized and the work is cold, then the resistance of the thermal element 328 is such that the first amplifier tube 252 will be biased to cut-off. When the work is heated, the thermo-element 328 will also be heated and its resistance will decrease so as to cause the grid 258 of the first amplifier tube 252 to become positive with respect to its cathode 256 and the tube will conduct, with the result that current will flow in the polarized relay coil 189 of a magnitude proportional to the work temperature.

The connections and operation of the equipment utilizing the thermo-pile embodiment of my invention is otherwise identical to that of the photo-electric device embodiment which has been heretofore described.

It will be clear from the foregoing description of illustrative embodiments of my invention that I have devised a regulator system for high frequency generators which will respond rapidly to variations in the system parameters to correct the high frequency generator output so as to maintain the work being treated at a substantially constant temperature, irrespective of such variations.

It will be understood that the embodiments of my invention which I have shown and described herein are merely illustrative of my invention, and it will be apparent to those skilled in the art that certain modifications may be made without departing from the spirit and scope of my invention.

My invention may be used in dielectric as well as induction heating applications. The phase shifter may be replaced by an induction regulator, or a saturable reactor.

My invention, therefore, is not to be restricted except insofar as is necessitated by the prior art and by the spirit of the appended claims.

I claim as my invention:

1. In a system for high frequency dielectric heating of work to be conveyed at a variable rate between a pair of electrodes, the combination comprising a high frequency oscillation generator having a power output tube and an output circuit disposed to supply high frequency potential to said electrodes, a power supply including an electric discharge device having a control grid and connected to control the power output tube of said high frequency generator, means for deriving a voltage proportional to the speed of said work, means for deriving a voltage proportional to the power supply electric discharge device load current, and means responsive to the resultant of said last mentioned voltages and connected to said control grid for changing the power supply output, whereby the work temperature will be maintained at a substantially constant value, irrespective of variations in the speed of said work.

2. In a system for high frequency induction heating of work to be conveyed at a variable rate through a work coil, the combination comprising a high frequency oscillatory generator having an output circuit disposed to supply high frequency potential to said work coil, a power supply including an electric discharge device having a control grid connected to said high frequency oscillatory generator, means for deriving a voltage proportional to the speed of said work, means for deriving a voltage proportional to the power supply electric discharge device load current, and means responsive to the resultant of said last mentioned voltages and connected to said control grid for changing the power supply output, whereby the work temperature will be maintained at a substantially constant value, irrespective of variations in the speed of said work.

3. In a system for controlling the heat supplied to work being conveyed past a predetermined point, the combination comprising an oscillator generator including at least one electric discharge device which has an anode and a cathode and having an output circuit disposed to supply energy at said predetermined point, a means including a rectifier having a control electrode and connected for supplying a control potential between said oscillator anode and cathode, first connections for deriving a voltage proportional to the speed of said work, second connections including a voltage dropping device in the plate circuit of said oscillator for obtaining a voltage proportional to said oscillator plate current, a means for comparing said voltages, and a means responsive to the resultant of said voltages and connected to the control electrode of said rectifier for controlling the output of said oscillator generator.

4. In a system for controlling the heat to be supplied to work being conveyed past a predetermined point, the combination comprising an oscillator generator including at least one electric discharge device which has an anode, a cathode and a grid and having an output circuit disposed to supply energy at said predetermined point, at least one electric discharge device having a control grid and connected for supplying a control potential between said oscillator anode and cathode, means for deriving a voltage proportional to the speed of said work, means for deriving a voltage proportional to said potential between said oscillator, anode and cathode, a means including a polarized relay for comparing said last mentioned voltages, and means responsive to the resultant of said voltages and connected to the control grid of said electric discharge device for varying the output of said oscillator generator.

5. In combination, a first electric discharge device having an anode and adapted to produce a variable output, a means including a phase shifter connected to said first electric discharge device for varying said output, a reversible motor rotatably connected to said phase shifter, a polarized relay having two coils and two contact positions and connected to control the direction of rotation of said motor, a high frequency generator connected to the output of said first electric discharge device and having a tank circuit including a work coil through which work to be heated is conveyed at a variable speed, means for placing a voltage proportional to the speed of said work on one coil of said polarized relay, and means including a second electric discharge device for deriving a voltage proportional to said first electric discharge device anode current for placing a voltage on the other coil of said polarized relay, whereby the temperature of the material being heated will be regulated to maintain a constant value at the heating point.

6. In a system for regulating the work temperature in the heat treatment of work to be conveyed at a variable rate through a heater unit, the combination comprising a source of high frequency oscillations including a power output tube having an anode, an output circuit connected to said power output tube and disposed to deliver heat energy to said heater unit, a gaseous discharge device having a control electrode and adapted to control the output of said power output tube, means for deriving a reference voltage which is proportional to the output of said power output tube required to maintain the desired work temperature, means for deriving a second voltage which varies in response to variations in the velocity of said work, means for comparing said reference voltage and said second voltage, and means responsive to the comparison resultant of said voltages and connected to the control grid of said gaseous discharge device for varying the output of said source of high frequency oscillations.

BRUCE BOYD.

References Cited in the file of this patent

UNITED STATES PATENTS

| Number | Name | Date |
| --- | --- | --- |
| 2,041,029 | Stargardter | May 19, 1936 |
| 2,175,694 | Jones | Oct. 10, 1939 |
| 2,205,424 | Leonard | June 25, 1940 |
| 2,251,277 | Hart et al. | Aug. 5, 1941 |
| 2,325,401 | Hurlston | July 27, 1943 |
| 2,391,085 | Crandell | Dec. 18, 1945 |
| 2,419,214 | Holman et al. | Apr. 22, 1947 |
| 2,436,027 | Vonada et al. | Feb. 17, 1948 |
| 2,448,008 | Baker | Aug. 31, 1948 |
| 2,459,616 | Burgwin | Jan. 18, 1949 |
| 2,461,283 | Jordan | Feb. 8, 1949 |
| 2,470,443 | Mittelmann | May 17, 1949 |
| 2,473,188 | Albin | June 14, 1949 |
| 2,487,432 | Fuge | Nov. 8, 1949 |
| 2,504,754 | Sweeny | Apr. 18, 1950 |

FOREIGN PATENTS

| Number | Country | Date |
| --- | --- | --- |
| 439,166 | Great Britain | Dec. 2, 1935 |